W. D. PAYNE.
EMERGENCY BRAKE.
APPLICATION FILED MAR. 25, 1909.

925,020.

Patented June 15, 1909.

Witnesses
J. H. Crawford

Inventor
William D. Payne,
By
Attorneys

UNITED STATES PATENT OFFICE.

WILLIAM D. PAYNE, OF WASHINGTON, DISTRICT OF COLUMBIA.

EMERGENCY-BRAKE.

No. 925,020.          Specification of Letters Patent.          Patented June 15, 1909.

Application filed March 25, 1909. Serial No. 485,761.

*To all whom it may concern:*

Be it known that I, WILLIAM D. PAYNE, a citizen of the United States, residing at Washington, in the District of Columbia, have invented certain new and useful Improvements in Emergency-Brakes; and I do hereby declare the following to be a full, clear, and exact description of the invention, such as will enable others skilled in the art to which it appertains to make and use the same.

This invention relates to brakes for vehicles and more especially to an emergency brake for street cars and the like.

One object of the invention is to improve the general construction of brakes of this character.

Another object of the invention is to provide an emergency brake wherein the braking power will at first be applied gradually to a wheel and then finally positively lock the wheel from rotation.

A third object of the invention is to provide an improved means whereby the braking power will be increased from the time of its first application until the wheel is finally locked positively against rotation.

With the above and other objects in view the invention consists in general of an improved brake mechanism arranged to be applied gradually and with increasing power and finally to positively lock the wheel against rotation.

The invention further consists in certain novel details of construction and combinations of parts hereinafter fully described, illustrated in the accompanying drawings, and specifically set forth in the claims.

Figure 1:
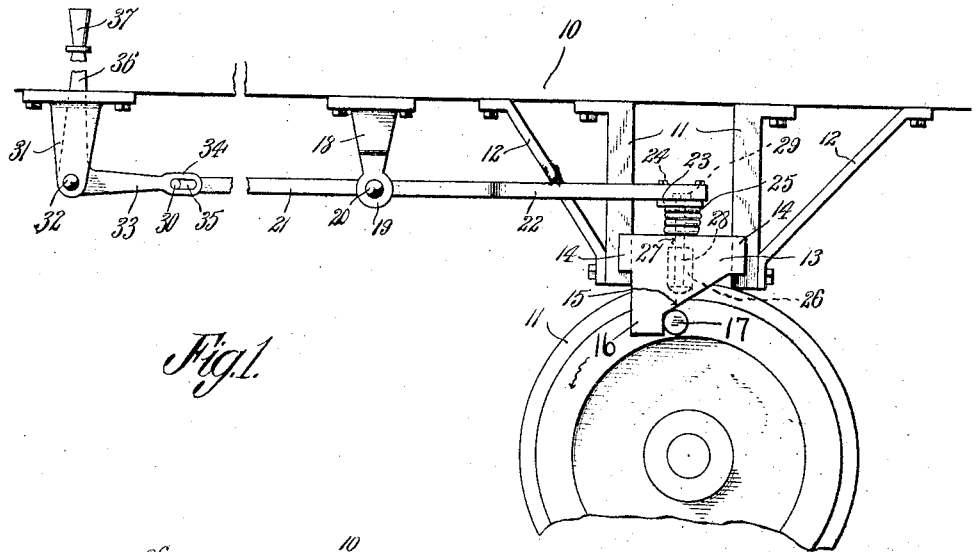
Figure 2:
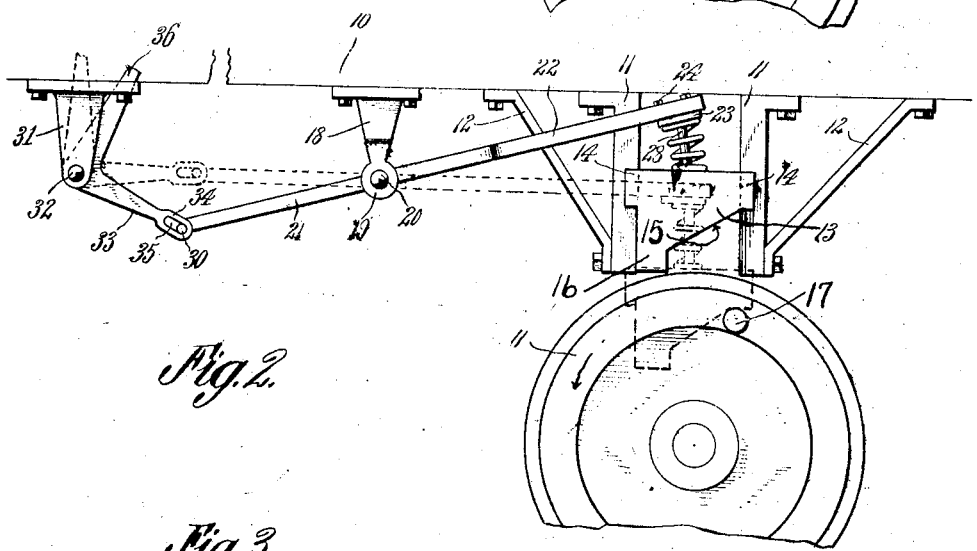
Figure 3:
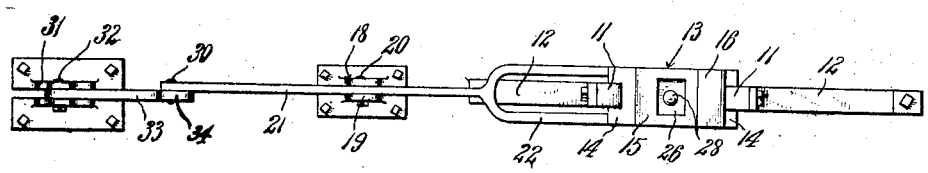

In the accompanying drawings, like characters of reference indicate like parts in the several views, and:—Figure 1 is a side elevation showing the brake in its locked position, only a portion of the car being shown. Fig. 2 is a similar view showing the brake at the beginning of the application in dotted lines and in released position in full lines. Fig. 3 is a bottom view, the wheel being shown in dotted lines.

The numeral 10 indicates a portion of a car to which this brake is applied and 11 one of the car wheels arranged for use in connection with this brake. Suspended from the bottom of the car 10 are a pair of spaced guides 11 securely braced to the car bottom by means of diagonal braces 12.

This part of the invention is preferably arranged directly over the truck and for the purposes of clearness of illustration the truck has been omitted from the drawing, it being understood that any desired truck may be used as the same forms no part of this invention. Slidably mounted between the guides 11 is a brake block 13 provided with flanges 14 which engage the guides and hold the brake block in position. This brake block is provided with an under surface having a beveled portion 15 terminating in a stop 16.

The wheel 11 is provided with a projecting lug 17 and in the case of wheels designed for use with this brake this lug is preferably cast integral with the wheel, while when the brake is used in connection with wheels already in use the lug 17 may consist of a common stud or through-bolt. This lug 17 is arranged to project laterally from the rim of the wheel and is so positioned that it strikes the beveled surface 15 of the block 13 when the latter is depressed.

In order to depress the block there is mounted upon the under side of the car a fulcrum casting 18 having at its lower end a fork 19 wherein is mounted a pivot pin 20. Secured on the pivot pin 20 is a lever 21 provided with a forked end 22 arranged so that one arm of the fork lies on one side and the other arm on the other side of one of the guides 11 and its brace 12. This forked end has its extremities so arranged that they lie intermediate of the guides 11 and these extremities are connected by means of a bearer plate 23 secured to both of the ends by bolts 24. This bearer plate is so arranged that it forms a brace for the forked ends as well as a spring seat for a spring 25 which is held between the plate 23 and the top of the brake block 13. The brake block 13 is provided with a vertically arranged pocket 26 terminating in an opening 27 through which passes a bolt 28 the head of which moves in the pocket 26 longitudinally thereof. The other end of this bolt is held in a suitable threaded opening formed in the plate 23 and may be provided with a lock nut 29. The bolt 28 is of such length as to permit movement of the block 13 to or from the plate 23, the amount of this movement being substantially equal to the vertical coördinate of the beveled surface 15.

The lever 21 has the end opposite the fork 22 provided with a pin 30 extending laterally therefrom. At 31 are shown spaced fulcrum castings which are securely bolted to the car 10 and support a pivot pin 32. Upon the pivot pin 32 is mounted a bent lever having an arm 33 provided with a forked end 34. The fork 34 has oppositely disposed slots 35 adapted to receive the ends of the pin 30. The bent lever is also provided with an upwardly extending arm 36 terminating at its upper end in an operating handle 37.

The device has here been shown as applied to but one end of a car and arranged to prevent the rotation of the wheel 11 but in one direction. It is obvious, however, that the same device might be applied in a reversed position to prevent rotation of the wheel in the opposite direction.

In order to understand the operation of the device let it be supposed that the car is moving toward the left of the figures and that the left hand end is the front. This will cause the wheel to rotate in the direction of the arrow. Now so long as the parts remain in the position indicated in Fig. 1 the wheel will be free to revolve in this direction. If, on the contrary, the handle 37 be pushed toward the front of the car the arm 33 of the bent lever will be raised and this will depress the forked end 22 of the lever 21 which will throw the block 13 into the position shown in dotted lines in Fig. 2. When the lug 17 is carried around by the wheel 11 it will strike the upper part of the bevel 15. As the revolution of the wheel continues the lug 17 will move along the bevel 15 and since the block 13 is prevented from lateral movement by the guides 11, will raise the block 13 and compress the spring 25. As this lug moves along the bevel the brake is thus gradually applied while at the same time, owing to the increased tension of the spring the braking force is constantly increased. This action goes on until the lug 17 strikes the stop 16 when the wheel is positively locked from rotation. By this construction the injurious shocks incident to the sudden application of a locking brake are eliminated. There has thus been provided a simple and efficient device of the character described and for the purpose specified.

It is obvious that minor changes may be made in the form and construction of this invention without departing from the material principles thereof. It is not therefore desired to confine the invention to the exact form herein shown and described; but it is wished to include all such as properly come within the scope of the appended claims.

Having thus described the invention, what is claimed as new, is:—

1. The combination of a vehicle wheel having a lug projecting therefrom, of a resiliently supported stop movable into and out of the path of said lug.

2. The combination of a vehicle wheel having a lug projecting therefrom, of a brake block provided with a beveled surface terminating in a stop and movable into and out of the path of said lug.

3. The combination of a vehicle wheel having a lug projecting therefrom, of a resiliently supported brake block provided with a beveled surface terminating in the stop and movable into and out of the path of said lug.

4. The combination of a vehicle wheel having a lug projecting therefrom, of a resiliently supported stop movable into and out of the path of said lug, and means for moving said stop.

5. The combination of a vehicle wheel having a lug projecting therefrom, of a brake block provided with a beveled surface terminating in a stop and movable into and out of the path of said lug and means for moving said stop.

6. The combination of a vehicle wheel having a lug projecting therefrom, of a resiliently supported brake block provided with a beveled surface terminating in the stop and movable into and out of the path of said lug and means for moving said stop.

7. The combination of a vehicle wheel having a lug projecting therefrom, of a stop movable into and out of the path of said lug and means for moving said stop, said means comprising a pivotally mounted lever, a spring held between one end of said lever and the stop, a limit bolt arranged to limit the movement of said stop relative to the lever, and means to operate said lever.

8. The combination of a vehicle wheel having a lug projecting therefrom, of a brake block provided with a beveled surface terminating in a stop and movable into and out of the path of said lug and means for moving said stop, said means comprising a pivotally mounted lever, a spring held between one end of said lever and the block, a limit bolt arranged to limit the movement of said block, and means to operate said lever.

In testimony whereof, I affix my signature, in presence of two witnesses.

WILLIAM D. PAYNE.

Witnesses:
ROBT. E. P. KREITER,
GEO. H. CHANDLEE.